May 12, 1970  R. W. HOUSTON ET AL  3,511,296
TIRE CHANGER HAVING FRICTION LOCK

Filed April 29, 1968  2 Sheets-Sheet 1

Inventors:
Robert W. Houston
Gaylord B. Haviland
James L. Wykoff
Donald R. Center
By
Attys.

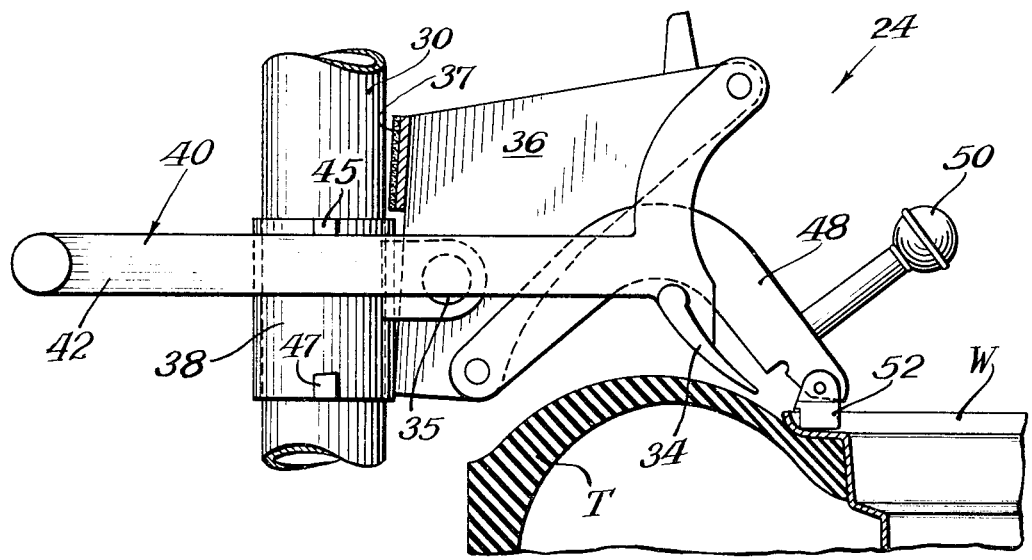
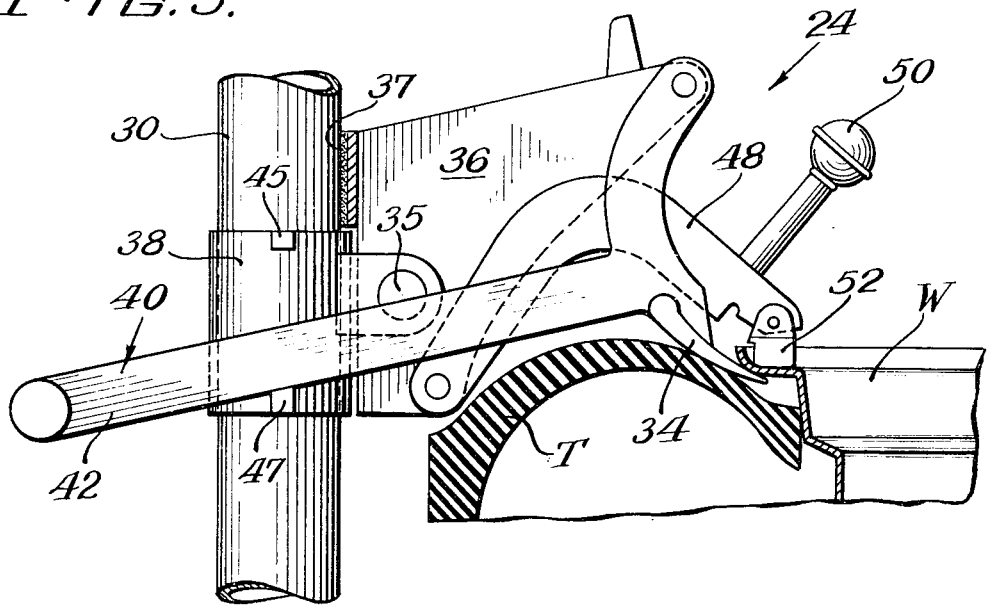

United States Patent Office 3,511,296
Patented May 12, 1970

3,511,296
TIRE CHANGER HAVING FRICTION LOCK
Robert W. Houston, Cincinnati, Gaylord B. Haviland, Maineville, James L. Wykoff, Cincinnati, and Donald R. Center, Maineville, Ohio, assignors, by mesne assignments, to Big Four Automotive Equipment Corporation, a corporation of Delaware
Filed Apr. 29, 1968, Ser. No. 725,108
Int. Cl. B60c 25/08
U.S. Cl. 157—1.24                                       5 Claims

ABSTRACT OF THE DISCLOSURE

A tire changer including a frame for supporting a tire and wheel, means for retaining the tire and wheel in place on the frame, and bead breaker mechanism for breaking the bond between the bead on the tire and the rim of the wheel. The bead breaker mechanism comprises a power column, a pivot tube movably carried on the power column for movement toward and away from the tire and the wheel secured on the frame independently of the power column, means pivoted on the pivot tube including a lock shoe for locking the pivot tube to the power column for movement therewith, engaging means and bead breaker means on the lock plate cooperating with one another to move the lock plate to lock the lock shoe against the power column and to break the bond between the rim and the bead. A handle is secured to the bead breaker means to release the lock shoe from the power column after the bond between the bead and rim have been broken to permit the pivot tube to be moved on the power column away from the tire and wheel.

SUMMARY OF THE INVENTION

This invention relates to a tire changer and, more particularly, to an improved tire changer incorporating a bead breaker mechanism provided with a friction lock.

Tire changers are commonly used by tire repair shops or service stations to remove a tire to be repaired or replaced from a wheel and to mount a tire on a wheel. Ordinarily, to dismount a tire, the tire and wheel are placed on the tire changer and clamped in place on a center post. The valve core is removed from the tire valve stem to permit the free escape of air from within the tire. The next step is to break the bond between the bead on the tire and the rim. A one time, the bead was broken by hand with a simple tool, however, more recently tire changers have been provided which incorporate bead breaker mechanisms to give a power assist to the breaking of the bond between the bead and rim. Though at first only one bead was broken at a time, machines are now known that have upper and lower bead breakers for simultaneously breaking the bond of both beads of a tire from the rims.

A mount-demount tool is affixed on the center post of the tire changer mechanism, with the end thereof between the rim and the upper bead of the tire. The tool is then rotated to raise the upper bead of the tire over the rim. This procedure is then repeated to raise the lower bead over the rim to remove the tire from the wheel.

One problem encountered with tire changers today is that the bead breaker mechanism must be adapted to accommodate tires of different tread widths and tires having different diameters. With respect to tread widths, it has been known to provide bead breaker mechanism, including an upper bead breaker having an actuator bar provided with a number of notches or teeth thereon dependent upon the range of tire widths the equipment is expected to handle. Such arrangement, however, is limiting in view of the numerous tire widths and it is desired that the bead breaker mechanism be able to readily accommodate a wide range of tire widths.

An object of the present invention is to provide an improved tire changer, wherein the disadvantages and deficiencies of prior construction are obviated.

Another object of the present invention is to provide an improved tire changer incorporating a bead breaker mechanism having a friction lock, which will enable the bead breaker mechanism to accommodate variations in tire widths over a great range.

Still another object of the present invention is to provide an improved tire changer having a bead breaker mechanism including a power column movable on the tire changer frame, a pivot tube movable on the power column, and engaging means and bead breaker means carried with the pivot tube for movement toward and away from a tire and wheel secured on the frame and cooperating with one another to lock the pivot tube to the power column during operation, such that operation of the power column will effect a power breaking of the bond between a bead on the tire and the rim of the wheel. Other objects and advantages of the present invention will become more apparent hereinafter.

BRIEF DESCRIPTION OF THE DRAWING

The drawing illustrates a preferred embodiment of the invention wherein:

FIG. 2 is a fragmentary elevation view of the tire changer, more clearly illustrating the upper bead breaker mechanism, with such mechanism illustrated just as it engages with a tire and wheel and before the friction lock is engaged, and FIG. 3 is a fragmentary elevation view similar to FIG. 2, illustrating the position of the upper bead breaker mechanism after the bead has been freed from the rim, with the friction lock engaged with the power column.

DESCRIPTION OF THE PREFERRED EMBODIMENT

Figure 1:
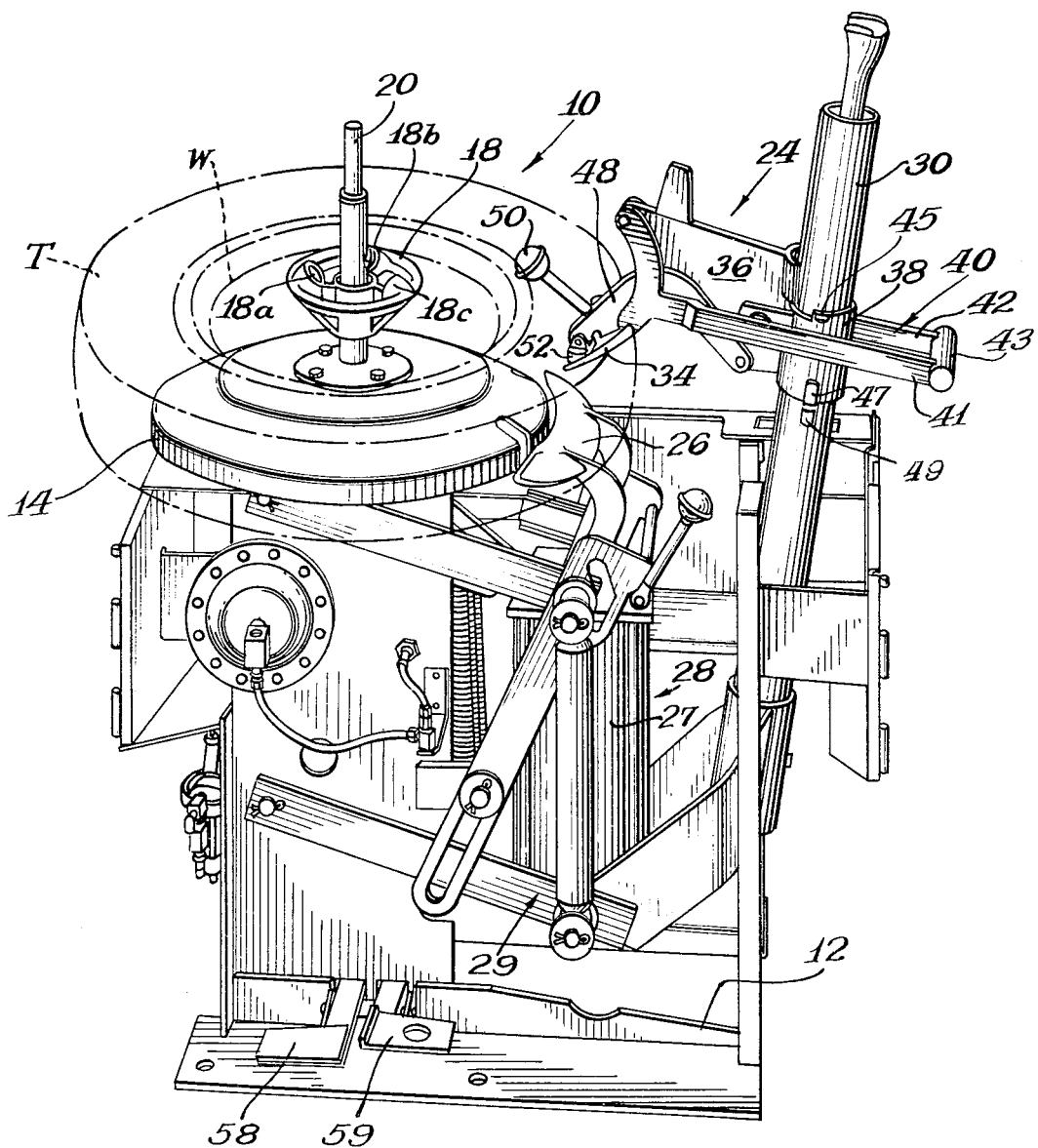
FIG. 1 is a perspective view of a tire changer embodying the principles of the present invention, with a cover removed to better illustrate the internal components.

Referring now to FIG. 1, there is illustrated the tire changer of the present invention. The tire changer 10 comprises a frame 12 for housing and supporting the components of the tire changer. Provided on the top of the frame 12 is a table or wheel rest plate 14 upon which the tire and wheel are adapted to be supported. The tire T and the wheel W are indicated in dotted line in FIG. 1.

The frame 12 includes means for retaining a tire and wheel in place on the frame. Such means comprises a lock cone or hold-down cone 18 which is adapted to be threadedly secured upon a drive shaft 20, which is suitably driven from a drive mechanism within the frame or housing 12. The cone 18 engages within the central opening in a wheel W carrying a tire T and is adapted to accommodate wheels of different sizes, for example, wheels within a range of 10 inches to 17.5 inches in diameter.

Also provided on the frame 12 are bead breakers for breaking the sealing bond between the beads on the tire sidewalls and the cooperating flanges of the rim or wheel. The bead breaker mechanisms include an upper bead breaker 24, a lower bead breaker 26 and power means 28 operatively connected to the bead breakers 24 and 26 for moving the two bead breakers with respect to one another to simultaneously break the upper and lower beads of a tire to be removed from a wheel retained on the table 14 of the frame 12. The power means 28 includes a power cylinder 27 operatively connected by link means 29 to the bead breakers 24 and 26.

A feature of the present invention is the construction of the upper bead breaker 24, which includes a friction lock shoe for effectively locking the bead breaker blade and bracket supports therefor to the power column 30. The upper bead breaker mechanism 24 includes a blade 34 which is adapted to engage between the upper rim of the wheel and the top of the bead of the tire, so as to separate the bead from the rim of the wheel. The blade 34 is pivotally carried on the lock plate 36, which lock plate is in turn pivoted to the pivot tube 38 that is carried on the power column 30 for sliding movement thereon.

A handle 40 is secured at one end to the blade 34. The handle 40 includes links 41 and 42, which are disposed in generally parallel relationship and extend rearwardly at each side of the pivot tube 38 and are connected together at the end remote from the bead breaker blade 34 by a hand grip 43.

Formed on the pivot tube 38 are spaced-apart stops 45 and 47 against which the handle links 41 and 42 are adapted to engage during use. The bead breaker mechanism 24 also includes a hook stop 48 pivotally mounted at its rear on the lock plate 36. Extending forwardly from the hook stop 48 is a handle 50 to permit actuation thereof with respect to the lock plate 36. Pivotally secured to the hook stop 48 is a swivel pad 52, which is adapted to engage with the top surface of the rim during normal operation as will be more clearly discussed hereinafter.

Extending outwardly from the frame 12 are a pair of foot pedals 58 and 59, which are adapted to be actuated by the machine operator. Operation of the pedal 58 will actuate the drive shaft 20 and actuation of the pedal 59 will move the bead breakers 24 and 26 to break the bead and then to separate the bead breaker mechanisms 24 and 26 one from the other.

Turning now to FIGS. 2 and 3, there is better illustrated the structure and operation of the bead breaker mechanism 24 of the present invention. The upper bead breaker assembly 24 is adapted to be rotated on the power column 30 as well as to move upwardly and downwardly on the power column. Initially, the upper bead breaker assembly 24 may be rotated about the axis of the power column so as to more readily permit a tire to be positioned on the table 14. With the tire in place on the table 14, the hold-down cone 18 is threaded onto the drive shaft 20 to secure the tire T in place. The upper bead breaker assembly 24 is then pivoted about the axis of the power column 30 over the tire T. The friction lock shoe 37 is out of engagement with the power column. The upper bead breaker assembly 24 is then lowered and falls by gravity, or, alternatively, is positioned such that the bead breaker blade 34 rests against the junction of the tire and the rim and the swivel pad 52 is on the rim of the wheel. So as to provide an "at rest" position of the pivot tube 38 on the column 30, stop 49 on the column 30 limits downward movement of the pivot tube 38. The normal position of the stop 49 will be below the point where the upper bead breaker assembly 24 engages the tire and wheel.

The seating action of the blade 34 pivots the lock plate 36 and the lock shoe 37 carried thereon moves into engagement and is locked to the power column 30. The operator may then step on the foot pedal 59 to actuate the power mechanism and move the power column 30 downwardly. The downward movement of the power column 30 increases the frictional force locking the lock shoe 37 to the power column 30 and as the bead breaker blade 34 moves further into the area between the bead and the rim, the bead is broken or released from its sealing bond with the flange of the wheel.

At the end of the bead breaker operation, the components are in the position as illustrated in FIG. 3. To release the bead breaker blade 34, the operator raises up or pulls up on the handle 40. The operator then may lift the handle 40 and the handle 50 to raise the upper bead breaker mechanism 24 from the wheel. When there is sufficient clearance between the blade 34 and swivel pad 50, the bead breaker mechanism 24 may be pivoted about the axis of the power column. The operator may apply lubricant to the bead of the tire and then position a tire tool on the drive shaft 20, with an end thereof between the tire and the wheel. Upon actuation of foot pedal 58, the drive shaft and the tire tool carried thereon will rotate 360° to move the upper portion of the tire sidewall over the rim. After the upper sidewall of the tire has been moved to the top side of the wheel, the tire tool is reinserted between the lower rim and the lower sidewall of the tire and the foot pedal 58 is again actuated to rotate the power or drive shaft 20 to raise the lower sidewall of the tire T over the rim and thereby entirely remove the tire from the wheel which has been retained on the table 14 by the cone 18. The three holes 18a, 18b and 18c in the cone 18 are provided to permit insertion of the mount-demount tool and provide extra locking leverage.

To replace or to mount a new tire on the empty wheel, the flanges of the wheel and the exterior surfaces of the upper and lower sidewalls of the tire adjacent the beads are lubricated. The tire T is then positioned over the wheel W and the mount-demount tool is positioned on the drive shaft 20, so as to force the lower sidewall of the tire over the upper flange of the wheel. The mount-demount tool is then repositioned so as to force the upper sidewall of the tire over the upper flange of the wheel such that the beads of the tire may then be expanded into position and in engagement with the flanges of the tire. The tire is filled with air in a conventional manner and after it has been filled with air, the hold-down cone 18, which was loosened before inflation of the tire, is removed and the tire and wheel may be removed from the frame 12.

There has been provided by the present invention an improved tire changer incorporating an upper bead breaker assembly having a friction lock. The upper bead breaker assembly 24 is adapted to be pivoted about the axis of the power column and to be moved freely on the power column. The friction lock will lock in any position along the exterior surface of the power column when the hook stop assembly and the upper head breaker blade 34 are in engagement with the tire and rim, respectively. Thus, it is apparent that the upper bead breaker assembly 24 of the present invention is well suited to accommodate tires of varying widths. The action of positioning the upper bead breaker assembly 24 in place will cause the pivotal action of the lock plate 36 about its axis 35, so as to move the lock shoe 37, which may be made of a suitable friction material, as, for example, a conventional brake shoe lining, into engagement with the exterior of the power column 30 to lock the lock plate 36 and the elements carried therewith to the power column 30. Subsequently, upon actuation of the power column downwardly, the lock plate and the upper bead breaker blade 34 will be carried downwardly therewith to break the sealing bond between the bead on the tire and the flange of the wheel. In the tire changer illustrated in FIG. 1, the lower bead breaker is actuated simultaneously with the upper bead breaker to break both beads from the tire flange at the same time.

While there has been shown and described a presently preferred embodiment of the invention, it will be obvious to those skilled in the art that various changes and modifications may be made therein without departing from the invention and, therefore, it is intended in the appended claims to cover all such changes and modifications as may fall within the true spirit and scope of the invention.

What is claimed is:

1. A tire changer comprising a frame, means on said frame for retaining a tire and wheel in place, bead breaker mechanism for breaking the bond between the bead on the tire and the flange of the wheels, and means for actuating the bead breaker mechanism, characterized by an improved bead breaker mechanism comprising a power column on said frame movable with respect to said frame, a pivot tube means movable on said power column, a lock plate pivoted on the pivot tube means and including a lock shoe thereon movable between engaged and disengaged positions with the power column for locking the lock plate and pivot tube to the power column, engaging means pivoted on the lock plate for engaging the wheel, and a bead breaker assembly pivoted on the lock plate and cooperating with the engaging means to move the lock shoe to engaged position, said bead breaker assembly including a blade member adapted to be inserted between the flange of the wheel and the bead on the tire.

2. A tire changer as in claim 1, wherein as the power column is moved in a first direction, the blade member engages between the flange and the bead to separate the bead from the flange.

3. A tire changer as in claim 2, wherein the bead breaker assembly includes a handle rigidly affixed to the blade member for actuating the blade member after the bead has been separated from the flange to move the lock shoe from engaged position and to permit the pivot tube assembly to be moved on the power column.

4. A tire changer as in claim 1, wherein the pivot tube means is rotatable on the power column and is movable longitudinally of the axis of the power column.

5. A tire changer as in claim 3, wherein the handle is elongated and is disposed on the opposite side of the power column from the bead breaker assembly, spaced stop means on the pivot tube means for limiting movement of the handle with respect to the pivot tube means, said handle being operative to release the lock shoe from engagement with the power column after the bead has been released from the rim, so as to permit movement of the pivot tube means on the power column in a direction opposite said first direction to permit movement of the bead breaker mechanism away from the tire and wheel on the frame.

References Cited
UNITED STATES PATENTS

| | | | |
|---|---|---|---|
| 3,056,449 | 10/1962 | Foster | 157—1.22 |
| 3,255,800 | 6/1966 | Strang et al. | 157—1.24 |

GRANVILLE Y. CUSTER, Jr., Primary Examiner